United States Patent [19]

Shu

[11] Patent Number: 4,785,076

[45] Date of Patent: Nov. 15, 1988

[54] POLYPHENYLENE ETHER RESIN BLENDS HAVING IMPROVED ULTRAVIOLET LIGHT STABILITY

[75] Inventor: Peter H. Shu, Schenectady, N.Y.

[73] Assignee: General Electric Company, Selkirk, N.Y.

[21] Appl. No.: 771,977

[22] Filed: Sep. 3, 1985

[51] Int. Cl.⁴ .............................................. C08K 5/34
[52] U.S. Cl. ...................................... 524/91; 524/99; 524/141; 524/508
[58] Field of Search .................... 524/91, 99, 141, 508

[56] References Cited

U.S. PATENT DOCUMENTS

| | | | |
|---|---|---|---|
| 3,563,934 | 2/1971 | Burnett | 524/96 |
| 3,640,928 | 2/1972 | Murayama et al. | 524/99 |
| 3,700,750 | 10/1972 | Yamanouchi et al. | 524/83 |
| 3,859,395 | 1/1975 | Terhune et al. | 524/141 |
| 4,102,850 | 7/1978 | Cooper et al. | 525/68 |
| 4,184,999 | 1/1980 | Olander | 524/141 |
| 4,198,334 | 4/1980 | Rasberger | 546/188 |
| 4,226,763 | 10/1980 | Dexter et al. | 524/91 |
| 4,234,706 | 11/1980 | White | 528/212 |
| 4,313,864 | 2/1982 | Haaf et al. | 524/141 |
| 4,526,917 | 7/1985 | Axelrod | 524/508 |

FOREIGN PATENT DOCUMENTS 61031  4/1982  Japan ..................... 524/91

Primary Examiner—Kriellion Morgan
Attorney, Agent, or Firm—Hedman, Gibson, Costigan & Hoare

[57] ABSTRACT

The ultraviolet light radiation stability as manifested, for instance, by the resistance to yellowing is improved for polyphenylene ether resins and blends by including a combination of a benzotriazole-based screening-type UV stabilizer and a hindered dipiperidinyl antioxidant-type UV stabilizer. The combination of the two stabilizers exhibits syneristic behavior in the compositions, conferring better resistance to yellowing than can be predicted and expected from the observed effects of each stabilizer alone. Flame retardant embodiments are illustrated.

33 Claims, No Drawings

POLYPHENYLENE ETHER RESIN BLENDS HAVING IMPROVED ULTRAVIOLET LIGHT STABILITY

BACKGROUND OF THE INVENTION

The polyphenylene ether (oxide) resins are high performance engineering thermoplastics characterized by relatively high melt viscosities and softening points. The resins are useful in many commercial applications requiring high temperatures resistance, and can be admixed with other polymers, such as polystyrene resins, to form blends which are extrudable or moldable into articles of various shapes and sizes. Polyphenylene ether resins and methods of their preparation are described in U.S. Pat. Nos. 3,306,874 and 3,306,875 (Hay), in U.S. Pat. Nos. 3,257,357 and 3,257,358 (Stamatoff), and elsewhere. Blends of polyphenylene ether resin and various styrenic polymers are disclosed by Cizek in U.S. Pat. No. 3,383,435.

The polyphenylene ether resins are prone to undergoing discoloration, that is, yellowing, during processing at elevate temperatures and, after molding, upon exposure to ultraviolet (UV) light for extended periods. To improve the color stability of these resins or of blends made of the resins, stabilizers are sometimes added, a number of which are disclosed in the patent literature. For instance, Bennett in U.S. Pat. No. 3,563,934 teaches that an alkanolamine or a morpholine can be incorporated in a polyphenylene oxide resin to improve the flow and stability of the polymer during molding, and to enable lighter colored objects to be molded from the polymer.

Murayama, et al. in U.S. Pat. No. 3,640,928 disclose that various synthetic polymers can be stabilized against photo- and thermal deterioration by incorporating certain sterically hindered piperidines.

The use of hindered phenols as thermal stabilizers for compositions of polyphenylene ethers (oxides) is described in U.S. Pat. No. 3,700,750 (Yamanouchi, et al.) and U.S. Pat. No. 4,184,999 (Olander).

Because polyphenylene ether resin blends are now used to produce a wider range of commercial articles, many of which are exposed to sunlight or bright indoor light during regular use, there is a desirability to find additional ways in which the UV-stability of the polymer can be improved without detracting from other important physical properties.

In one previous development, it has been found that certain hindered amine compounds, which more specifically are hydrid forms of a hindered piperidine and a hindered phenol, are effective to stabilize polyphenylene ether resins and blends against UV light radiation effects. These compounds, which are described in U.S. Pat. No. 4,198,334 (Rasberger), apparently function as UV screening agents which absorb harmful light rays.

In a separate development, it has previously been found that certain compounds based on benzotriazole are also effective as UV light stabilizers for polyphenylene ether resins and blends. These compounds apparently act as antioxidants which block or interrupt the free radical photooxidation process in the polymer.

These two types are not without disadvantages, however. Both are susceptible to photooxidation and either undergo degradation or are consumed in the process of protecting the polymer. Thus, to compensate, the polymer must usually be loaded up with relatively larger amounts of these additives, which increases the cost of manufacture and can sometimes lead to sacrifices in other physical properties.

SUMMARY OF THE INVENTION

The discovery has now been made that certain compounds in combination are synergistically effective in small amounts to provide enhanced ultraviolet light radiation stability in polyphenylene ether resins and compositions of such resins.

More particularly, the ultraviolet light stabilizing agent comprises a combination of (i) a compound having the formula:

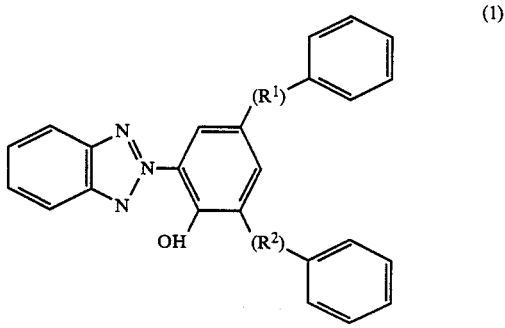

(1)

in which $R_1$ and $R_2$ are independently divalent radicals derived from $C_2$ to $C_{20}$ alkanes or alkenes straight or branched, and (ii) a compound having the formula:

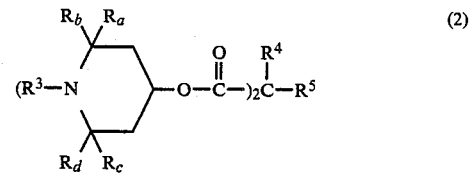

(2)

in which $R_a$, $R_b$, $R_c$ and $R_d$ each independently represents alkyl having from 1 to 6 carbon atoms; $R^3$ represents hydrogen, —OH or alkyl having from 1 to 12 carbon atoms; $R^4$ represents a hydroxybenzyl group of the formula:

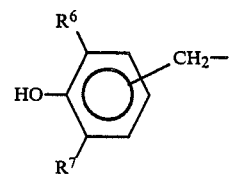

in which $R^6$ and $R^7$ each independently represents an alkyl group, straight lined or branched, having from 1 to 9 carbon atoms, and $R^5$ represents an alkyl group having from 1 to 20 carbon atoms.

The synergistic relationship between the two types of compounds is illustrated in the Examples, where a compound in accordance with formula 1 and a compound in accordance with formula 2, in combination, are compared with each alone in otherwise the same polymer blend. The combination imparts a higher degree of resistance a higher degree of resistance to yellowing in the molded article than can be expected from the measured behavior of each compound alone.

The aforementioned stabilizing compounds, which are described in greater detail below, are useful in the following types of compositions in accordance with this invention:

1. Blends comprising (a) polyphenylene ether resin and (b) stabilizer;
2. Blends comprising (a) polyphenylene ether resin, (b) stabilizer and (c) rubber modified, high impact poly-(alkenyl aromatic) resin;
3. Blends comprising (a) polyphenylene ether resin, (b) stabilizer and (c) plasticizer, with or without (d) impact strength modifier;
4. Flame retardant versions of any of the foregoing; and
5. Filled versions of any of the foregoing.

DESCRIPTION OF THE INVENTION

In its broadest aspects, the invention comprises thermoplastic compositions which are admixtures of
(a) a polyphenylene ether resin; and
(b) an ultraviolet light radiation stabilizing amount of an ultraviolet light stabilizer which is a synergistic combination of compounds (i) and (ii) described above.

For the compounds of formula (1) above, which are employed as component (b) (i) in the compositions, examples of substituents $R^1$ and $R^2$ include divalent radicals derived from straight lined compounds such as ethane, propane, butane, pentane, hexane, heptane, octane, nonane, decane, undecane, dodecane, tridecane, tetradecane, pentadecane, and hexadecane, as well as branched alkanes such as isobutane, isopentane, neopentane, isohexane, and so forth.

Particularly referred are those compounds in which $R^1$ and $R^2$ are derived from $C_2$ to $C_{10}$ alkanes especially $C_2$ to $C_6$ alkanes, and most of all, propane, to give a compound having the formula

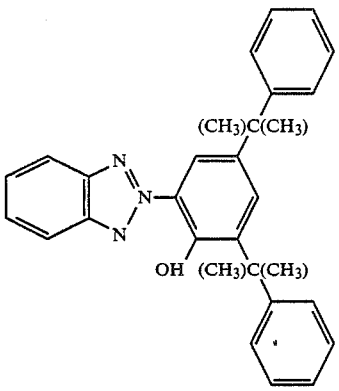

A commercial product with this formula is available from Ciba-Geigy Corporation under the trade designation Tinuvin 234.

For those compounds represented by formula (2) above, which make up component (b) (ii), in the preferred embodiments the substituents $R_a$, $R_b$, $R_c$ and $R_d$ are methyl, $R^3$ is methyl or hydrogen, and especially hydrogen, $R^6$ and $R^7$ are branched alkyl, and especially tert butyl, and $R^5$ is $C_1$ to $C_6$ alkyl, that is, methyl, ethyl, propyl, butyl, pentyl or hexyl, straight lined or branched, and especially n-butyl. Most highly preferred is the compound butyl-(3,5-di-tert-butyl-4-hydroxybenzyl)malonic acid-bis(2,2,6,6-tetramethyl-4-piperidinyl) ester, which has the formula

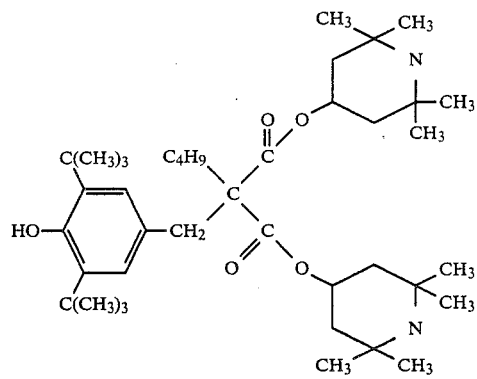

A commercial product having this formula is available from Ciba-Geigy Corporation under the trade designation Tinuvin 144.

Only small amounts of component (b) are needed in the usual case to impart good ultraviolet light resistance in the composition. For instance, preferred embodiments will comprise from about 0.1 to about 10 parts by weight of (b), which includes components (b)(i) and (b)(ii) combined, for each 100 parts by weight of total resin in the composition, that is, polyphenylene ether resin if used alone, or polyphenylene ether resin together with polystyrene resin, etc.

The polyphenylene ethers (also known as polyphenylene oxides) used in the present invention are a well known class of polymers widely used in industry as a result of the discovery by Allan S. Hay of an efficient and economical method of preparation. Since their discovery, they have given rise to numerous variations and modifications but still may, as a class, be generally characterized by the presence of arylenoxy structural units. The present invention includes all of said variations and modifications, including but not limited to those described hereinafter.

The polyphenylene ethers generally comprise structural units having formula I, below. In each of said units independently, each $Q^1$ is independently hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Suitable polyphenylene ethers are disclosed in a large number of U.S. patents. The following are illustrative but not limiting:

| | | | |
|---|---|---|---|
| 3,226,361 | 3,330,806 | 3,929,930 | 4,234,706 |
| 3,234,183 | 3,390,125 | 4,028,341 | 4,334,050 |
| 3,257,357 | 3,431,238 | 4,054,533 | 4,340,696 |

| -continued | | | |
|---|---|---|---|
| 3,257,358 | 3,432,466 | 4,092,294 | 4,345,050 |
| 3,262,892 | 3,546,174 | 4,097,556 | 4,345,051 |
| 3,262,911 | 3,700,630 | 4,140,675 | 4,374,959 |
| 3,268,478 | 3,703,564 | 4,158,728 | 4,377,662 |
| 3,306,874 | 3,733,307 | 4,207,406 | 4,477,649 |
| 3,306,875 | 3,875,256 | 4,221,881 | 4,477,651 |
| 3,318,959 | 3,914,266 | 4,226,951 | 4,482,697 |
| | | | 4,517,341. |

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in various Hay patents. Also contemplated are graft copolymers, including those prepared by grafting onto the polyphenylene ether chain such vinyl monomers as acrylonitrile and vinylaromatic compounds (e.g., styrene), and such polymers as polystyrene and elastomers. Other suitable polyphenylene ethers are the coupled polyphenylene ethers in which the coupling agent is reacted with the hydroxy groups of two polyphenylene ether chains to increase the molecular weight of the polymer. Illustrative coupling agents are low molecular weight polycarbonates, quinones, heterocyclics and formals.

The polyphenylene ether generally has a molecular weight (number average, as determined by gel permeation chromatography, whenever used herein) within the range of about 5,000–40,000; its intrinsic viscosity is most often in the range of about 0.45–0.5 dl./g., as measured in chloroform at 25° C.

The polyphenylene ethers may be prepared by known methods, typically by the oxidative coupling of at least one corresponding monohydroxyaromatic compound. A particularly useful and readily available monohydroxyaromatic compound is 2,6-xylenol (wherein each $Q^1$ is methyl and each $Q^2$ is hydrogen), whereupon the polymer may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound such as a copper, manganese or cobalt compound, usually in combination with various other materials.

A first class of preferred catalyst systems consist of those containing copper. Such catalysts are disclosed, for example, in the aforementioned U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Manganese-containing systems constitute a second preferred class of catalysts. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and α-diketones. Also useful are cobalt-containing catalyst systems.

The following additional patents disclose manganese- and cobalt-containing catalyst systems for polyphenylene ether preparation:

| | | |
|---|---|---|
| 3,956,242 | 4,083,828 | 4,184,034 |
| 3,962,181 | 4,093,596 | 4,315,086 |
| 3,965,069 | 4,093,597 | 4,335,233 |
| 3,972,851 | 4,093,598 | 4,385,168. |
| 4,058,504 | 4,102,865 | |
| 4,075,174 | 4,110,312 | |

Particularly useful polyphenylene ethers for the purposes of this invention are those which comprise molecules having at least one of the end groups of formulas II and III, below, wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines an preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of formula IV, below, with numerous beneficial effects often including an increase in impact strength and compatibilization with other blend components. Reference is made to the aforementioned U.S. Pat. Nos. 4,054,553, 4,092,294, 4,477,651 and 4,517,341.

Polymers with biphenol end groups of formula III are typically obtained from reaction mixtures in which a by-product diphenoquinone of formula V, below, is present, especially in a copper-halide-secondary or tertiary amine system. In this regard, the disclosures of the aforementioned U.S. Pat. Nos. 4,234,706, 4,477,649 and 4,482,697 are particularly pertinent. In mixtures of this type, the diphenoquinone is ultimately incorporated into the polymer in substantial proportions, largely as an end group.

In many polyphenylene ethers obtained under the above-described conditions, a substantial proportion of the polymer molecule, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

The formulas referred to above are as follows:

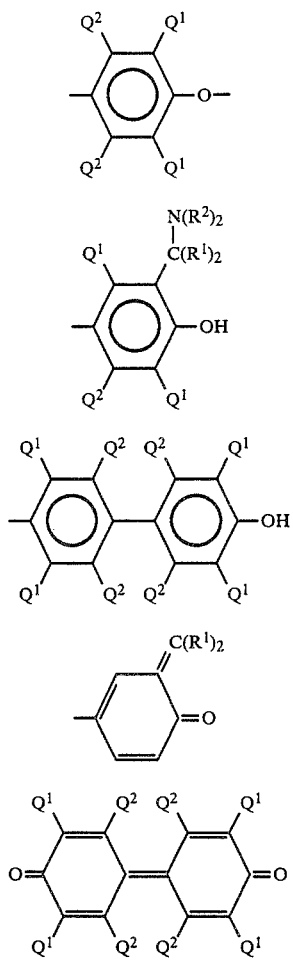

It will be apparent to those skilled in the art from the foregoing that the polyphenylene ethers contemplated for use in the present invention include all those presently known, irrespective of variations in structural units or ancillary chemical features. To insure completeness of disclosures and to facilitate an understanding of the scope of the present invention, the relevant disclosures of all of the patents listed hereinabove are incorporated by reference herein. If a rubber modified, high impact alkenyl aromatic resin is used together with the polyphenylene ether (oxide) resin, it is preferred that the alkenyl aromatic portion is derived at least in part from a compound or compounds of the formula

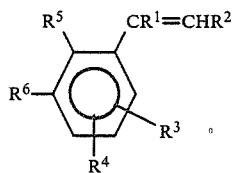

wherein $R^1$ and $R^2$ are selected from the group consisting of lower alkyl or alkenyl groups of from 1 to 6 carbon atoms, and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl or alkenyl groups of from 1 to 6 carbon atoms, or $R^5$ or $R^6$ may be concatenated together with hydrocarbyl groups to form a naphthyl group.

Compounds within the above formula include styrene and its homologs and analogs. In addition to styrene, examples include alpha-methyl styrene, para-methyl styrene, 2,4-dimethyl styrene, chlorostyrene, dichlorostyrene, bromostyrene, dibromostyrene, p-tert-butylstyrene, p-ethylstyrene, vinyl xylene, divinylbenzene, and vinyl naphthalene. Styrene is especially preferred.

Suitable rubber modifiers, which can be in admixture or interpolymerized with the alkenyl aromatic resin, include natural rubber, as well as synthetic rubbers such as polyisoprene, polybutadiene, polychloroprene, ethylene-propylene-diene terpolymers (EPDM rubber), styrene-butadiene copolymers (SBR rubber), styrene-acrylonitrile copolymers (SAN), ethylene-propylene copolymers (EPR rubber), acrylonitrile rubbers, polyurethane rubbers and polyorganosiloxane (silicone) rubbers.

The rubber content can vary widely, but generally will range in amount from about 5 to about 45 percent by weight, depending on particular requirements of impact resistant modification.

The polyphenylene ether resin and the rubber modified, high impact poly(alkenyl aromatic) resin are admixable in virtually all proportions, for example, in a weight ratio between 95:5 and 5:95 of the two, and more often between 80:20 and 20:80.

The plasticizer will generally be any high boiling liquid or low melting solid having the effect of softening the composition and reducing the glass transition temperature of the polyphenylene ether resin. The plasticizer may be selected from among non-polymeric and polymeric materials known to exert effects. By way of illustration, suitable types include linear aliphatic esters based on dibasic acids, such as adipates, azelates, and sebacates, or linear aliphatic esters based on phosphorus. Other suitable types include cyclic esters, such as phthalates, terephthalates, benzoates and trimellitates.

Especially preferred are organic phosphate plasticizers, and particularly aromatic phosphate compounds of the formula:

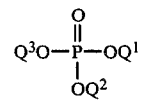

in which each Q represents the same or a different radical selected independently from among alkyl, cycloalkyl, aryl, alkyl-substituted aryl, aryl-substituted alkyl, halogen, and hydrogen, with at least one Q always being aryl.

Examples include phenylbisodecyl phosphate, phenylbisneopentyl phosphate, phenylethylene hydrogen phosphate, phenyl-bis-(3,5,5'-triethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis(2-ethylhexyl) phenyl phosphate, tri(nonyl-phenyl)phosphate, phenylmethyl hydrogen phosphate, di(dodecyl)p-tolyl phosphate, tricresyl phosphate, triphenyl phosphate, dibutylphenyl phosphate, 2-chloroethyldiphenyl phosphate, p-tolyl-bis(2,5,5'-trimethylhexyl)phosphate, 2-ethylhexyldiphenyl phosphate, diphenyl hydrogen phosphate, and the like. Most preferred are triphenyl phosphate and its derivatives, for example, isopropylated triphenyl phosphate.

Also useful are polymeric plasticizing resins, such as polystyrene homopolymers, which exert a plasticizing function in the present blends.

In general, amounts from the minimum effective, for example, about 5 parts by weight, up to about 30 parts by weight, per 100 parts of the combined polymeric ingredients, are employed in the plasticized embodiments, with particular amounts being dependent on specific requirements.

Plasticized components in accordance with the invention can and often do also include effective amounts of an impact strength modifier or modifiers. These may be selected from among polymeric materials customarily employed for this purpose. Typically, the impact modifiers will be copolymers or terpolymers of alkenyl aromatic compounds of the formula shown above with rubber or elastomer precursors. Preferred are linear, graft or radial teleblock copolymers of styrene and a diene, for instance, copolymers of styrene and butadiene or of styrene and isoprene, as well as hydrogenated versions thereof in which the degree of unsaturation has been reduced. The amounts are conventional.

The compositions of this invention may also contain other ingredients. These may be selected from among the various materials customarily employed with polyphenylene ether resins and blends as inert extenders or to enhance the chemical and physical properties. Examples include flame retardant agents, mineral fillers (for instance, clay, talc, mica and aluminum silicate), reinforcing agents (for instance, glass fibers, flakes or spheres, or titanate fibers), coloring agents (for instance, dyes or pigments), plasticizers, odor suppressants, mold release agents, flow enhancers (for instance, melt viscosity reducers), and so forth. These may be employed singly or in combination, in amounts which are conventional.

The flame retardant agent or agents may be selected from among materials containing chemical elements known for their ability to impart flame resistance, for example, bromine, chlorine, antimony, phosphorus and nitrogen. Included among them are various aliphatic and aromatic phosphates, phosphonates and phosphites; halogenated (brominated or chlorinated) organic compounds; halogenated organic compounds in admixture with antimony oxide; halogen-containing compounds in admixtures with phosphorus compounds containing phosphorus-nitrogen bonds; halogenated (brominated or chlorinated) polymers such as polystyrene and aromatic polycarbonates or their lower molecular weight oligomeric counterparts.

Special mention is made of flame retardant organic phosphorus containing compounds, especially aromatic phosphates such as found among the compounds mentioned above, as well as di- and polyfunctional phosphates as disclosed in British Pat. No. 2,043,833; stable halogen-containing flame retardant compounds, especially brominated or chlorinated bis-phenoxy alkanes; and brominated or chlorinated polystyrenes. Especially preferred are triphenyl phosphate and isopropylated triphenyl phosphate, which have the capability of functioning as both a plasticizer and flame retardant in suitable proportions in the present blends. Amounts of up to about 30 parts by weight for each 100 parts of the polymeric components are typical for the flame retardant agent in the compositions of this invention.

Preparation of the compositions into shaped articles may be accomplished in any conventional or convenient manner. In one procedure, the ingredients are dry- or solution blended, the mixture is passed through a screw extruder at a temperature of from about 450° to about 650° F., the extrudate is cooled, chopped into pieces and then injection molded at a temperature of from about 450° to about 650° F.

The compositions may be prepared into any of the types of articles for which polyphenylene ether resin blends are known, and they are especially advantageous for the manufacture of products intended for regular use in the outdoors, or indoors under bright artificial light, either of which can change the original color of the plastic surface over a period of time. By way of illustration, the compositions of this invention can be made into grilles, headlamp bezels, wheelcovers and decorative trim on automobiles, home laundry and dishwasher consoles, air conditioner grilles, personal care or home use products such as coffee makers, food processors, curling irons and shower massagers, bases and housings for office business machines, TV cabinets, and so forth.

DESCRIPTION OF THE SPECIFIC EMBODIMENTS

The invention is illustrated in the following examples, which are intended to show best or preferred embodiments and are not to be construed as limiting.

EXAMPLES 1-3

Various thermoplastic compositions were prepared with 45 parts by weight of poly(2,6-dimethyl 1,4-phenylene)ether resin (PPO ®, General Electric Co.), 55 parts by weight of rubber modified, high impact polystyrene resin, 13 parts by weight of isopropylated triphenyl phosphate (Kronitex ® 50, FMC Corp.), 1.5 part by weight of polyethylene, 0.5 part by weight of diphenyl decyl phosphite, 0.15 part by weight of zinc sulfide, 0.15 part by weight of zinc oxide and 3 parts by weight of titanium dioxide. To one such composition, no stabilizer was added. To others, butyl-(3,5-di-tert butyl-4-hydroxy-benzyl)-malonic acid-bis(2,2,6,6-tetra methyl-4-piperidinyl)ester (Tinuvin 144, Ciba-Geigy Corp., a hindered amine antioxidant-type UV stabilizer), by itself, or 2(2'-hydroxy-3',5'-bis(di-methyl benzyl) phenyl) benzotriazole (Tinuvin 234, Ciba-Geigy Corp. a combination benzotriazole and hindered phenol screening-type UV light stabilizer), by itself, or both, in the amounts shown in the Table below, were included.

Each of the compositions was prepared by pre-blending the ingredients at room temperature (about 23°–25° C.) using a mixer, extruding the pre-blend through a twin-screw extruder at 540° C., and injection molding the extrudate into test pieces using an injection melt temperature of 450° C. and a mold temperature of 180° C.

The molded samples were evaluated for UV light resistance by exposure in an Atlas Xenon Arc UV test apparatus, under a glass panel having a thickness of 0.130 inch, and measuring the yellowness index at various time intervals. The time needed to reach a change in yellowness index ($\Delta Y.I.$) equivalent to +1 was determined in each case. The percentage of synergism, if any, for the compositions containing both of the UV stabilizers was calculated using the following equation:

$$\text{Synergism (\%)} = \frac{(t_s - t_c) - ((t_1 - t_c) + (t_2 - t_c))}{(t_1 - t_c) + (t_2 - t_c)}$$

where $t_s$ = exposure time required to reach $\Delta Y.I. = +1$ for combination of additive 1 (Tinuvin 234) and additive 2 (Tinuvin 144) at the same concentration; $t_c$ = exposure time required to reach $\Delta Y.I. = +1$ of control sample (containing no additive); $t_1$ = exposure time required to reach $\Delta Y.I. = +1$ for additive 1; $t_2$ = exposure time required to reach $\Delta Y.I. = +1$ for additive 2.

The results are shown in the Table. The amounts for the additives are stated in parts by weight per 100 parts of total resin weight.

TABLE
Polyphenylene Ether Resin Blends Containing None or Various Amounts of UV Stabilizers

| Example | UV Stabilizer, Tinuvin 234 | UV Stabilizer, Tinuvin 144 | Day of Exposure to Reach $\Delta Y.I. = +1$ | Ratio to Control Samples | Percent Synergism |
|---|---|---|---|---|---|
| Control | 0 | 0 | 10.8 | 1 | — |
| 1A* | 0.25 | 0 | 18.6 | 1.7 | — |
| 1B* | 0 | 0.25 | 16.1 | 1.5 | — |
| 1 | 0.25 | 0.25 | 25.6 | 2.4 | 13.0 |
| 2A* | 0.5 | 0 | 20.6 | 1.9 | — |
| 2B* | 0 | 0.5 | 24.6 | 2.3 | — |
| 2 | 0.5 | 0.5 | 39.2 | 3.6 | 20.3 |
| 3A* | 1.0 | 0 | 21.4 | 2.0 | — |
| 3B* | 0 | 1.0 | 34.0 | 3.2 | — |
| 3 | 1.0 | 1.0 | 55.5 | 5.3 | 32.2 |

*Comparison Composition, only one of the two additives present.
**Calculated according to equation shown.

As can be seen from the Table, the percentage of synergism increases as the concentrations of the UV stabilizers (Tinuvin 234 and Tinuvin 144) increase.

The synergistic effect is illustrated in the Figure, in relation to the control sample and the samples containing each of the additives by themselves. The improvement over the shorter term (that is, exposure time required to reach $\Delta Y.I. = +1$) as well as over the longer term (that is, leveled-off $\Delta Y.I.$ values) are both indicated beside the respective curves.

I claim:
1. A thermoplastic composition, comprising
(a) a polyphenylene ether resin; and
(b) an ultraviolet light resistance enhancing amount of a stabilizer which consists of a combination of
(i) a compound having the formula:

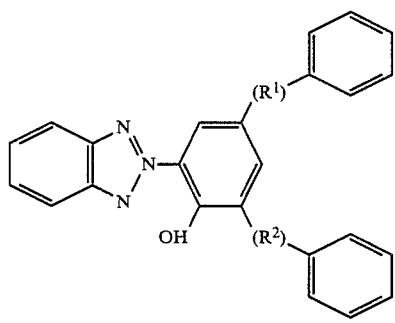

in which $R^1$ and $R^2$ are independently divalent radicals derived from $C_2$ to $C_{20}$ alkanes or alkenes, straight lined or branched, and
(ii) a compound having the formula

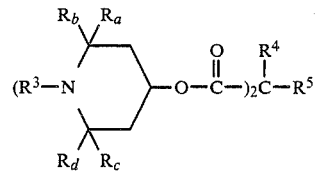

in which $R_a$, $R_b$, $R_c$ and $R_d$ each independently represents alkyl having from 1 to 6 carbon atoms; $R^3$ represents hydrogen, —OH or alkyl having from 1 to 12 carbon atoms; $R^4$ represents a hydroxybenzyl group of the formula

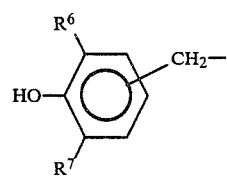

in which $R^6$ and $R^7$ each independently represents a branched alkyl group having from 1 to 9 carbon atoms, and $R^5$ represents an alkyl group having from 1 to 20 carbon atoms.

2. A composition according to claim 1, in which component (b)(i) is a compound having the formula

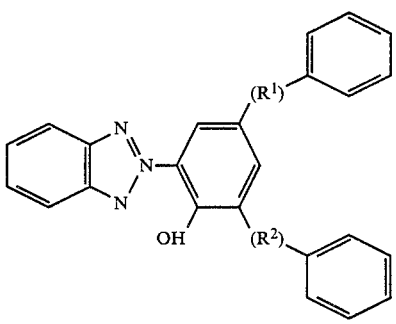

in which $R^1$ and $R^2$ are independently divalent radicals derived from $C_2$ to $C_6$ alkanes.

3. A composition according to claim 2, in which component (b)(i) is a compound having the formula

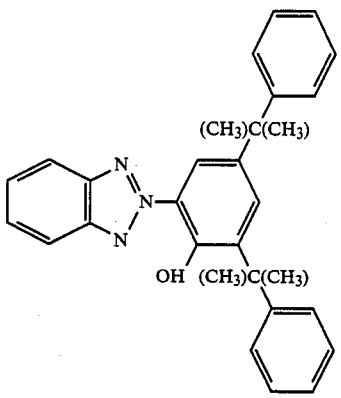

4. A composition according to claim 1, in which component (b)(ii) is a compound having the formula

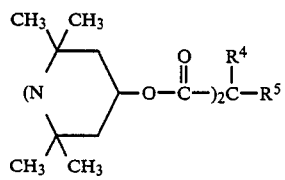

in which $R^4$ represents a hydroxybenzyl group of the formula

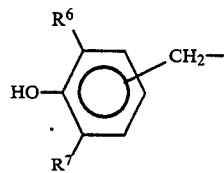

in which $R^6$ and $R^7$ each independently represents an alkyl group having from 1 to 9 carbon atoms, and $R^5$ represents an alkyl group having from 1 to 6 carbon atoms, straight lined or branched.

5. A composition according to claim 4, in which component (b)(ii) is a compound having the formula

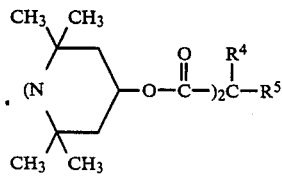

in which $R^4$ represents a hydroxybenzyl group of the formula

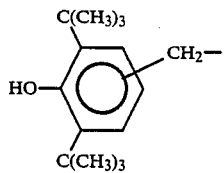

and $R^5$ represents an alkyl group having from 1 to 6 carbon, straight lined or branched.

6. A composition according to claim 5, in which component (b)(ii) is butyl-3,5-di-tert-butyl-4-hydroxybenzyl)-malonic acid-bis(2,2,6,6-tetramethyl-4-piperidinyl)ester.

7. A composition according to claim 1, in which the polyphenylene ether resin, component (a), comprises structural units having the formula

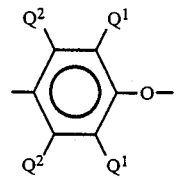

in which each $Q^1$ for each unit independently is independently hydrogen, halogen, primary or secondary alkyl having from 1 to 7 carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy, or halohydrocarbonoxy as defined for $Q^1$.

8. A composition according to claim 7, in which each $Q^1$ is alkyl or phenyl and each $Q^2$ is hydrogen.

9. A composition according to claim 8, in which each $Q^1$ is $C_{1-4}$ alkyl.

10. A composition of claim 9, in which the polyphenylene ether resin is a homopolymer or copolymer containing 2,6-dimethyl-1,4-phenylene ether units.

11. A composition according to claim 10, in which the polyphenylene ether homopolymer is poly(2,6-dimethyl-1,4-phenylene ether) resin.

12. A composition according to claim 10, in which the polyphenylene ether copolymer is poly(2,6-dimethyl-co-2,3,6-trimethyl-1,4-phenylene ether)resin.

13. A composition according to claim 7, in which the polyphenylene ether resin has at least one end group selected from any of the following formulas

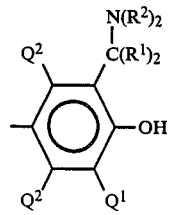

and

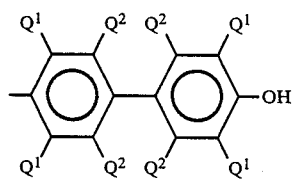

in which each $Q^1$ is independently hydrogen, halogen, primary or secondary alkyl having from 1 to 7 carbon atoms, phenyl, haolalkyl or aminoalkyl wherein at least two carbon atoms separate the halogen or nitrogen atom from the benzene ring, hydrocarbonoxy wherein at least two carbon atoms separate the halogen and oxygen atoms; and each is independently hydrogen, halogen, primary or secondary lower alkyl, phenyl, haloalkyl, hydrocarbonoxy, or halohydrocarbonoxy as defined for $Q^1$ and wherein each $R^1$ is independently hydrogen or alkyl, with the proviso that the total number of carbon atoms in both $R^1$ radicals is 6 or less; and each $R^2$ is independently hydrogen or $C_{1-6}$ primary alkyl radical.

14. A composition according to claim 1, in which components (b)(i) and (b)(ii) are present in a combined amount from about 0.1 to about 10 parts by weight per each 100 parts by weight of total resin in the composition.

15. A composition according to claim 1, which also includes a rubber modified, high impact poly(alkenyl aromatic) resin.

16. A composition according to claim 15, in which the poly(alkenyl aromatic) resin is derived at least in part from a compound or compounds of the formula

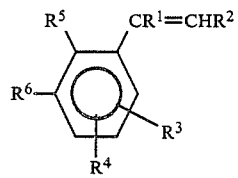

in which $R^1$ and $R^2$ are selected from the group consisting of lower alkyl or alkenyl groups of from 1 to 6 carbon atoms, and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl or alkenyl groups of from 1 to 6 carbon atoms, or $R^5$ and $R^6$ may be concatenated together with hydrocarboxyl groups to form a naphthyl group.

17. A composition according to claim 15, in which the rubber modified, high impact poly(alkenyl aromatic) resin is rubber modified, high impact polystyrene resin.

18. A composition according to claim 15, in which the weight ratio of the polyphenylene ether resin to the rubber modified, high impact polystyrene resin is between 80:20 and 20:80.

19. A composition according to claim 1, which includes a plasticizer, alone, or together with an impact modifier.

20. A composition according to claim 19, in which the plasticizer is present in an amount from about 5 to about 30 parts by weight per 100 parts by weight of the combined polymeric ingredients.

21. A composition according to claim 19, in which the impact modifier is a linear, graft or radial teleblock copolymer of styrene and a diene.

22. A composition to claim 1, which includes a flame retardant amount of one or more flame retardant agents.

23. A composition according to claim 22, in which the flame retardant agent is an aromatic phosphate.

24. A composition according to claim 23, in which the aromatic phosphate is triphenyl phosphate.

25. A composition according to claim 23, in which the aromatic phosphate is isopropylated triphenyl phosphate.

26. A composition according to claim 25, in which the isopropylated triphenyl phosphate also functions as a plasticizer.

27. A composition according to claim 1, which includes one or more additional ingredients selected from the group consisting of mineral fillers, glass reinforcing agents, coloring agents, melt flow enhancers, and mold release agents.

28. An article molded from the composition of claim 1.

29. An article molded from the composition of claim 3.

30. An article molded from the composition of claim 6.

31. An article molded from the composition of claim 11.

32. An article molded from the composition of claim 17.

33. An article molded from the composition of claim 27.

* * * * *